(12) United States Patent
Robinson et al.

(10) Patent No.: US 9,054,525 B2
(45) Date of Patent: Jun. 9, 2015

(54) METHODS AND APPARATUS FOR DYNAMICALLY ADJUSTING AN OVER-CURRENT PROTECTION THRESHOLD

(71) Applicant: MOTOROLA MOBILITY LLC, Libertyville, IL (US)

(72) Inventors: James C. Robinson, Lawrenceville, GA (US); Michael G. Hanley, Lawrenceville, GA (US); Jason N. Howard, Alpharetta, GA (US)

(73) Assignee: Google Technology Holdings LLC, Mountain View, CA (US)

( * ) Notice: Subject to any disclaimer, the term of this patent is extended or adjusted under 35 U.S.C. 154(b) by 128 days.

(21) Appl. No.: 13/959,767

(22) Filed: Aug. 6, 2013

(65) Prior Publication Data

US 2014/0268459 A1    Sep. 18, 2014

Related U.S. Application Data

(60) Provisional application No. 61/779,004, filed on Mar. 13, 2013.

(51) Int. Cl.
*H02H 3/00* (2006.01)
*H02H 3/093* (2006.01)
*H02H 7/20* (2006.01)

(52) U.S. Cl.
CPC ............... *H02H 3/093* (2013.01); *H02H 3/006* (2013.01); *H02H 3/0935* (2013.01); *H02H 7/20* (2013.01)

(58) Field of Classification Search
CPC ...... H02H 3/093; H02H 3/006; H02H 3/0935
USPC ................................................ 361/87, 93.1
See application file for complete search history.

(56) References Cited

U.S. PATENT DOCUMENTS

| | | | |
|---|---|---|---|
| 5,754,383 A | 5/1998 | Huppertz et al. | |
| 6,664,798 B2 * | 12/2003 | De Jong et al. | ............ 324/750.3 |
| 6,998,818 B2 | 2/2006 | Xiong et al. | |
| 7,162,656 B2 | 1/2007 | Vogman | |
| 2002/0105767 A1 | 8/2002 | Schuellein et al. | |
| 2002/0118500 A1 * | 8/2002 | Covi et al. | ..................... 361/93.1 |

(Continued)

OTHER PUBLICATIONS

Texas Instruments: "Two-Cell, Three-Cell, and Four-Cell Lithium-Ion or Lithium-Polymer Battery Protection AFE", SLUS629A—Jan. 2005—Revised Aug. 2005, bq29312A, all pages.

(Continued)

*Primary Examiner* — Thienvu Tran
*Assistant Examiner* — Tien Mai

(57) ABSTRACT

Methods and apparatus for dynamically adjusting an over-current protection threshold (514) are disclosed. A dynamic over-current protection circuit (104) receives a first trigger to switch to a high discharge current mode. The dynamic over-current protection circuit (104) starts a high-current timer (210) and increases the over-current protection threshold (514) in response to receiving the trigger. The dynamic over-current protection circuit (104) decreases the over-current protection threshold (514) and starts a hold-off timer (212) in response to an expiration of the high current timer (210). The hold-off timer (212) prevents a second trigger from causing a switch to the high discharge current mode until the hold-off timer expires.

24 Claims, 5 Drawing Sheets

(56) References Cited

U.S. PATENT DOCUMENTS

| | | |
|---|---|---|
| 2004/0100748 A1 | 5/2004 | Liu et al. |
| 2005/0050370 A1 | 3/2005 | Vyssotski et al. |
| 2006/0262473 A1 | 11/2006 | Neesgaard et al. |
| 2009/0097179 A1 | 4/2009 | Chen et al. |
| 2010/0214709 A1 | 8/2010 | Hall et al. |
| 2012/0195076 A1 | 8/2012 | Zhang et al. |

OTHER PUBLICATIONS

Invitation to Pay Additional Fees for PCT Application No. PCT/US2014/017538, mailed Jun. 6, 2014, 5 pages.

International Search Report and Written Opinion for PCT Patent Application No. PCT/US2014/017538, mailed on Sep. 19, 2014, 14 pages.

* cited by examiner

METHODS AND APPARATUS FOR DYNAMICALLY ADJUSTING AN OVER-CURRENT PROTECTION THRESHOLD

The present disclosure relates in general to electrical power protection, and, in particular, to methods and apparatus for dynamically adjusting an over-current protection threshold.

BACKGROUND OF THE INVENTION

In order to prevent a potentially damaging and/or dangerous amount of electrical current from being delivered to an electrical circuit, most modern electronic devices, such as smart phones, include some form of over-current protection. For example, an electronic device may include a fuse that opens, thereby preventing the flow of electrical current, when the current through the fuse exceeds some predetermined threshold (e.g., 8 amps).

Typically, when the over-current condition is present, something has gone wrong, and terminating the flow of current is the desired behavior. However, some electronic devices may include certain operations (e.g., a camera flash) that cause the current to spike above the normal limit for a short period of time in a well understood and desired manner. In order to accommodate these situations, the circuitry must be designed to tolerate these higher current conditions (both the good and the bad ones), and doing so increases the cost and complexity of the electronic device.

DETAILED DESCRIPTION OF THE PREFERRED EMBODIMENTS

Figure 1:
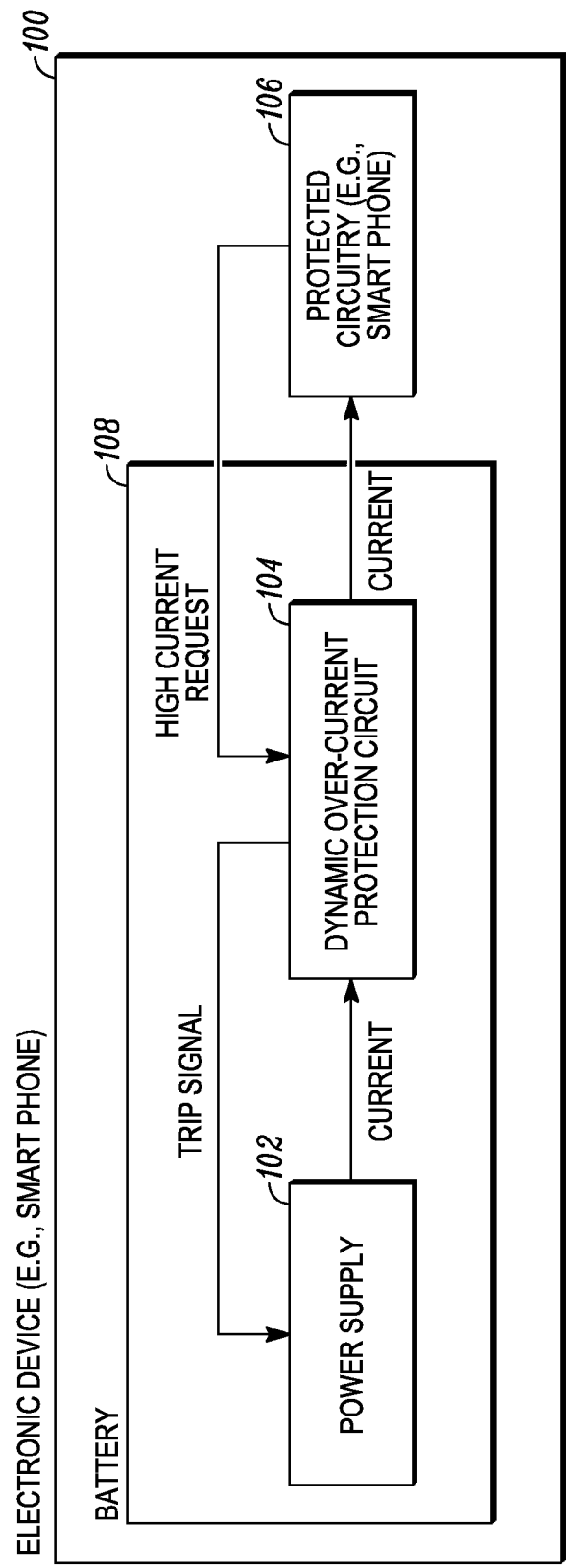
FIG. 1 is a block diagram of an example electronic device with a dynamic over-current protection circuit.

Briefly, in a specific embodiment, a cellular phone or other electronic device includes a dynamic over-current protection circuit, which receives a trigger to switch to a high discharge current mode. The trigger may be automatically generated when a current threshold is crossed (e.g., at the beginning of a camera flash), or another circuit may request the high discharge current mode (e.g., right before a camera flash). Upon entering the high discharge current mode, the dynamic over-current protection circuit starts a high-current timer, which limits the duration of the high discharge current mode. During the high discharge current mode, higher levels of current are allowed unless the current also exceeds the new higher threshold (e.g. such as a short circuit event). If the current exceeds the higher threshold for a certain period of time (e.g., 16 mS), the dynamic over-current protection circuit generates a trip signal to protect certain circuitry from an over-current condition. After the high discharge current mode times out, the current threshold is lowered and a hold-off period is entered during which another high discharge current mode cannot be entered. If the current exceeds the lower threshold for the same or a different period of time (e.g., 16 mS or 32 mS), the dynamic over-current protection circuit generates a trip signal to protect the circuitry from an over-current condition. After the hold-off period ends, the dynamic over-current protection circuit may respond to additional triggers to switch to the high discharge current mode.

More generally, methods and apparatus for dynamically adjusting an over-current protection threshold are disclosed. In an embodiment, the apparatus includes an over-current comparator structured to compare a sample current to the dynamic over-current protection threshold and generate a trip signal if the sample current is higher than the dynamic over-current threshold. An electrical current sampler, operatively coupled to the over-current comparator, is structured to supply the sample current to the over-current comparator. A dynamic over-current threshold generator, operatively coupled to the over-current comparator, is structured to increase the dynamic over-current protection threshold supplied to the over-current comparator. A high-current timer, operatively coupled to the dynamic over-current threshold generator, is structured to cause the dynamic over-current threshold generator to decrease the dynamic over-current protection threshold. A hold-off timer, operatively coupled to the dynamic over-current threshold generator, is structured to temporarily prevent the dynamic over-current threshold generator from raising the dynamic over-current protection threshold.

In an embodiment, the apparatus includes a trigger generator, operatively coupled to the dynamic over-current threshold generator, which is structured to cause the dynamic over-current threshold generator to increase the dynamic over-current protection threshold supplied to the over-current comparator. In an embodiment, the trigger generator is structured to detect a sample current level exceeding the over-current protection threshold. In an embodiment, the trigger generator is structured to receive a request from an electronic device to temporarily enter a high discharge current mode. In an embodiment, the electronic device is structured to enable a camera flash or other predictable high current event during the high discharge current mode. In an embodiment, the trigger generator is structured to receive the request via a discrete input. In an embodiment, the trigger generator is structured to receive the request via a memory location. In an embodiment, the over-current comparator is structured to produce the trip signal in response to the sample current level exceeding the over-current protection threshold after increasing the over-current protection threshold. In an embodiment, the over-current comparator is structured to produce the trip signal in response to the sample current level exceeding the over-current protection threshold after decreasing the over-current protection threshold.

Turning now to the figures, a block diagram of an example electronic device 100 with a dynamic over-current protection circuit 104 is illustrated in FIG. 1. In this example, the electronic device 100 includes a power supply 102, a dynamic over-current protection circuit 104, and protected circuitry 106. For example, the protected circuitry 106 may be some portion or all of a smart phone. In some embodiments, the power supply 102 and the dynamic over-current protection circuit 104 are contained within a battery 108. During normal operation, the power supply 102 supplies electrical current to the protected circuitry 106 via the dynamic over-current protection circuit 104. If the current supplied by the power supply 102 exceeds certain limits (e.g., 7 A in some circumstances and 8.5 in other circumstances), the dynamic over-current protection circuit 104 prevents the high current from flowing to the protected circuitry 106.

In some circumstances, the protected circuitry 106 may intentionally cause a spike in the current drain. For example, the protected circuitry 106 may be taking a photograph using a light emitting diode (LED) flash. Accordingly, the protected circuitry 106 may issue a high current request to the dynamic over-current protection circuit 104. In such a circumstance, the dynamic over-current protection circuit 104 may allow the current to exceed a certain limit for a certain limited amount of time in order to allow the otherwise protected circuitry 106 to carry out some short term high current function such as a photographic flash.

Alternatively, or in addition, the dynamic over-current protection circuit 104 may automatically determine that it should temporarily allow a high current event. For example, if the over-current protection circuit 104 detects that the current exceeds a first threshold, the over-current protection circuit 104 may temporarily raise the allowed current limit to a second higher threshold. However, if the current exceeds the higher threshold, or after some time continues to exceed the first threshold, the over-current protection circuit 104 may stop the current from flowing from the power supply 102 to the protected circuitry 106. In either case (an external request or automatically), the over-current protection circuit 104 may need to enter a hold-off period before another high current event is allowed.

Figure 2:
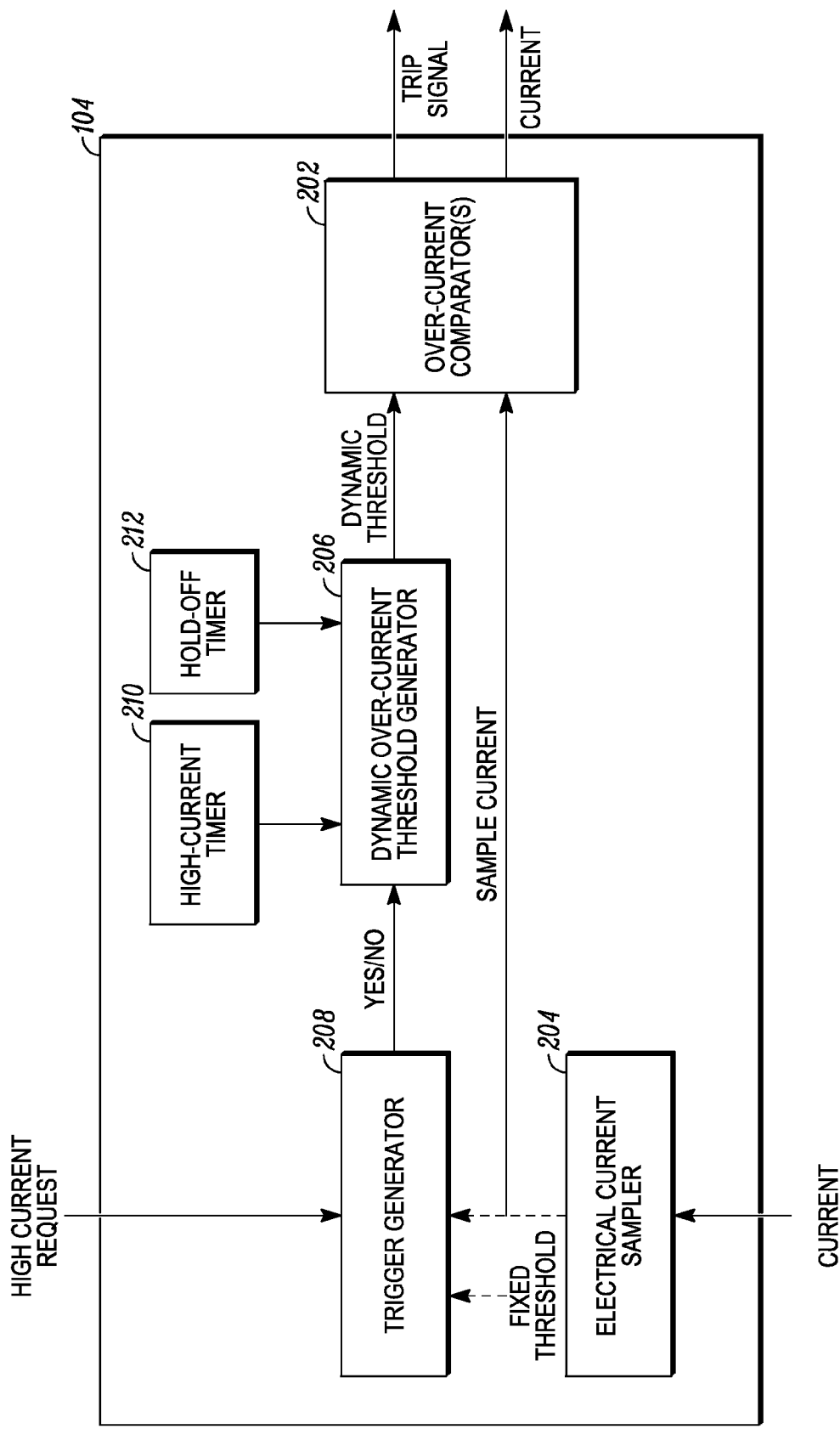
FIG. 2 is a block diagram of an example dynamic over-current protection circuit.

A block diagram of an example dynamic over-current protection circuit 104 is illustrated in FIG. 2. In this example, the dynamic over-current protection circuit 104 includes one or more over-current comparators 202. The over-current comparator 202 includes a sample current input and a dynamic threshold input. The over-current comparator 202 compares the sample current input to the dynamic threshold input. If the sample current is above of the dynamic threshold for a short period of time, the over-current comparator 202 may generate a trip signal. If the sample current stays below the dynamic threshold, the over-current comparator 202 continues to deliver current from the power supply 102 to the protected circuitry 106.

In this example, the sample current comes from an electrical current sampler 204 connected to the power supply 102, and the dynamic threshold comes from a dynamic over-current threshold generator 206. The dynamic over-current threshold generator 206 adjusts the threshold that the over-current comparator 202 uses when determining if the sample current is too high. Typically, the dynamic over-current threshold generator 206 holds the dynamic threshold at a first level. Upon a request from a trigger generator 208, the dynamic over-current threshold generator 206 may raise the dynamic threshold.

If the dynamic over-current threshold generator 206 raises the dynamic threshold in response to a request from the trigger generator 208, a high current timer 210 is started. If the high current timer 210 expires while the dynamic over-current threshold generator 206 is holding the dynamic threshold at the higher level, the dynamic over-current threshold generator 206 lowers the dynamic threshold. In other words, the dynamic over-current threshold generator 206 is typically not allowed to hold the dynamic threshold at the higher level for more than some predetermined period of time (e.g., 1 second).

Once the dynamic over-current threshold generator 206 lowers the dynamic threshold, a hold-off timer 212 is started. While the hold-off timer 212 is running (e.g., 1 second), the dynamic over-current threshold generator 206 is not allowed to raise the dynamic threshold again until the hold-off timer 212 expires. Accordingly, requests from the trigger generator 208 to raise the dynamic threshold are ignored when the hold-off timer 212 is running.

The trigger generator 208 may automatically generate the request to raise the dynamic threshold if the sample current from the electrical current sampler 204 exceeds a predetermined threshold. For example, if the sample current goes above the initial lower dynamic threshold, the trigger generator 208 may automatically generate a request to raise the dynamic threshold.

Alternatively, or in addition, the trigger generator 208 may make a request to raise the dynamic threshold based on an external high current request. In such an instance, a portion of the protected circuitry 106 may make the high current request to the trigger generator 208. For example, a smart phone with a camera function may be preparing to take a picture with a LED flash. The LED flash may cause a short spike in the power requirements. Accordingly the protected circuitry 106 may make the high current request in order to take the flash picture without causing an over-current condition that results in power being cut off from the power supply 102 to the protected circuitry 106.

Figure 3:
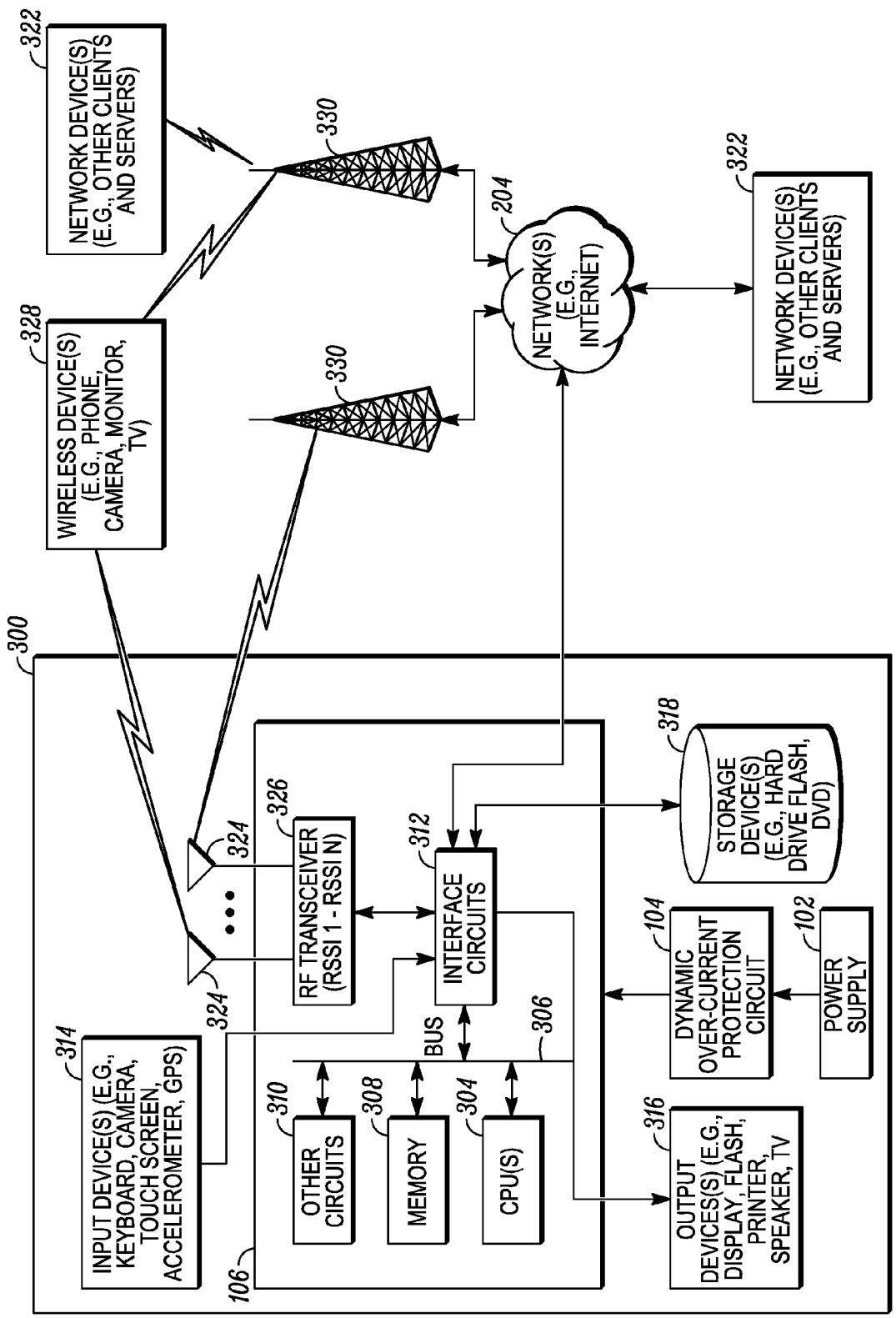
FIG. 3 is a block diagram of another example electronic device with a dynamic over-current protection circuit.

The electronic device 100 illustrated in FIG. 1 and protected by the dynamic over-current protection circuit 104 may include certain common aspects of many electronic devices such as microprocessors, memories, peripherals, etc. A block diagram of certain elements of an example electronic device 300 is illustrated in FIG. 3. The example electrical device 300 includes a main unit 106 which may include, if desired, one or more physical processors 304 electrically coupled by an address/data bus 306 to one or more memories 308, other computer circuitry 310, and one or more interface circuits 312. The processor 304 may be any suitable processor or plurality of processors. For example, the electrical device 300 may include a central processing unit (CPU) and/or a graphics processing unit (GPU).

The memory 308 may include various types of non-transitory memory including volatile memory and/or non-volatile memory such as, but not limited to, distributed memory, read-only memory (ROM), random access memory (RAM) etc. The memory 308 typically stores a software program that interacts with the other devices in the system as described herein. This program may be executed by the processor 304 in any suitable manner. The memory 308 may also store digital data indicative of documents, files, programs, web pages, etc. retrieved from a server and/or loaded via an input device 314.

The interface circuit 312 may be implemented using any suitable interface standard, such as an Ethernet interface and/or a Universal Serial Bus (USB) interface. One or more input devices 314 may be connected to the interface circuit 312 for entering data and commands into the main unit 106. For example, the input device 314 may be a keyboard, mouse, touch screen, track pad, isopoint, camera, voice recognition system, accelerometer, global positioning system (GPS), and/or any other suitable input device.

One or more displays, printers, speakers, monitors, televisions, high definition televisions, and/or other suitable output devices 316 may also be connected to the main unit 106 via the interface circuit 312. The display 316 may be a cathode ray tube (CRTs), liquid crystal displays (LCDs), electronic ink (e-ink), and/or any other suitable type of display. The display 316 generates visual displays of data generated during operation of the device 300. For example, the display 316 may be used to display web pages and/or other content received from a server 106 and other device. The visual displays may include prompts for human input, run time statistics, calculated values, data, etc.

One or more storage devices 318 may also be connected to the main unit 106 via the interface circuit 312. For example, a hard drive, CD drive, DVD drive, and/or other storage devices may be connected to the main unit 106. The storage devices 318 may store any type of data used by the device 300.

The electrical device 300 may also exchange data with other network devices 322 via a connection to a network 302. The network connection may be any type of network connection, such as an Ethernet connection, digital subscriber line (DSL), telephone line, coaxial cable, wireless base station 330, etc. Users of the system 100 may be required to register with a server 106. In such an instance, each user may choose a user identifier (e.g., e-mail address) and a password which may be required for the activation of services. The user identifier and password may be passed across the network 302 using encryption built into the user's browser. Alternatively, the user identifier and/or password may be assigned by the server 106.

In some embodiments, the device 300 may be a wireless device 300. In such an instance, the device 300 may include one or more antennas 324 connected to one or more radio frequency (RF) transceivers 326. The transceiver 326 may include one or more receivers and one or more transmitters operating on the same and/or different frequencies. For example, the device 300 may include a blue tooth transceiver 316, a Wi-Fi transceiver 316, and diversity cellular transceivers 316. The transceiver 326 allows the device 300 to exchange signals, such as voice, video and data, with other wireless devices 328, such as a phone, camera, monitor, television, and/or high definition television. For example, the device 300 may send and receive wireless telephone signals, text messages, audio signals and/or video signals directly and/or via a base station 330. A receive signal strength indicator (RSSI) associated with each receiver generates an indication of the relative strength or weakness of each signal being received by the device 300.

Figure 4:
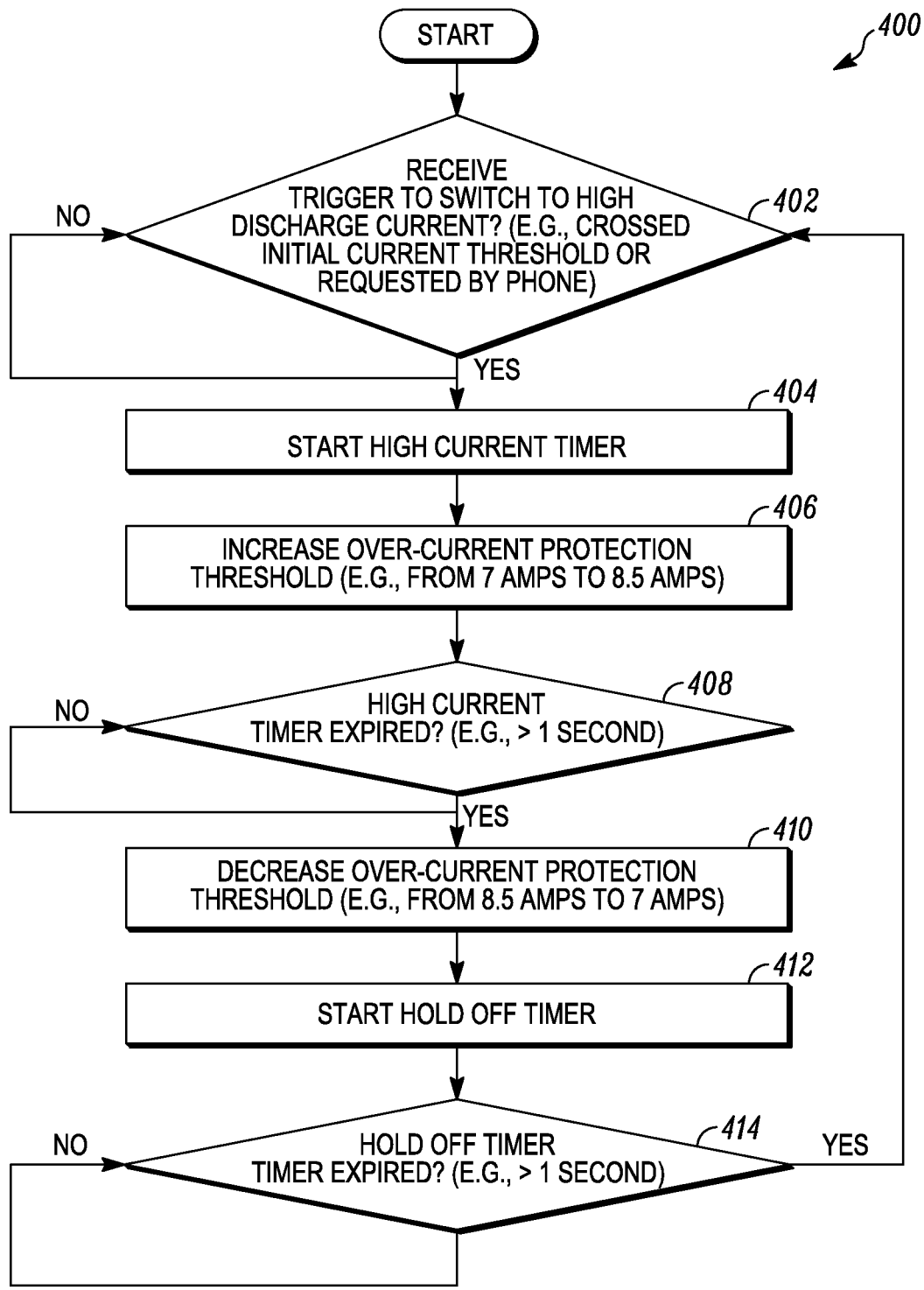
FIG. 4 is a flowchart of an example process for dynamically adjusting an over-current protection threshold.

A flowchart of an example process 400 for dynamically adjusting an over-current protection threshold is illustrated in FIG. 4. The process 400 may be carried out by one or more suitably programmed processors, such as a CPU executing software (e.g., block 304 of FIG. 3). The process 400 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 400 is described with reference to the flowchart illustrated in FIG. 4, it will be appreciated that many other methods of performing the acts associated with process 400 may be used. For example, the order of many of the operations may be changed, and some of the operations described may be optional.

In general, a dynamic over-current protection circuit receives a trigger to switch to a high-discharge current mode. The trigger may be automatically generated when a current threshold is crossed (e.g., at the beginning of a camera flash), or another circuit may request the high discharge current mode (e.g., right before a camera flash). Upon entering the high discharge current mode, the dynamic over-current protection circuit starts a high current timer, which limits the duration of the high discharge current mode. During the high discharge current mode, higher levels of current are allowed unless the current also exceeds the new higher threshold (e.g. such as a short circuit event). If the current exceeds the higher threshold for a certain period of time (e.g., 16 mS), the dynamic over-current protection circuit generates a trip signal to protect certain circuitry from an over-current condition.

After the high discharge current mode times out, the current threshold is lowered and a hold-off period is entered during which another high discharge current mode cannot be entered. If the current exceeds the lower threshold for the same or a different period of time (e.g., 16 mS or 32 mS), the dynamic over-current protection circuit generates a trip signal to protect the circuitry from an over-current condition. After the hold-off period ends, the dynamic over-current protection circuit may respond to additional triggers to switch to the high discharge current mode.

In this example, the process 400 begins when the dynamic over-current protection circuit 104 receives a trigger to switch to a high discharge current mode (block 402). For example, the initial current threshold may have been crossed causing an automatic generation of the trigger. Alternatively, or in addition, the protected circuit 106, or another circuit, may request the high discharge current mode. For example, a smart phone about to take a flash picture may make a high current request to the dynamic over-current protection circuit 104.

Once the dynamic over-current protection circuit 104 receives the trigger to switch to the high discharge current mode, the dynamic over-current protection circuit 104 starts a high current timer 210 (block 404). Subsequently, the dynamic over-current threshold generator 206 increases the over-current protection threshold (block 406). For example, the dynamic over current threshold generator 206 may increase the over-current protection threshold from 7 A to 8.5 A in order to allow for a flash picture to be taken.

While the dynamic threshold is in the increased state, the dynamic over-current threshold generator 206 monitors the high current timer 210 to see if the timer 210 is expired (block 408). Once the high current timer 210 expires, the dynamic over-current threshold generator 206 automatically decreases the over-current protection threshold (block 410). For example, the dynamic over-current threshold generator 206 may decrease the dynamic threshold from 8.5 A to 7 A.

Once the dynamic threshold is lowered, the dynamic over-current threshold generator 206 starts the hold-off timer 212 (block 412). While the hold off timer is running, the dynamic over-current threshold generator 206 is prevented from receiving additional triggers to switch to high discharge current mode and/or the triggers are received, but the dynamic over-current threshold generator 206 does not raise the dynamic threshold. Once the hold off timer 212 expires (block 414), the dynamic over-current threshold generator 206 returns to a state of looking for additional triggers to switch to high discharge current mode (block 402).

Figure 5:
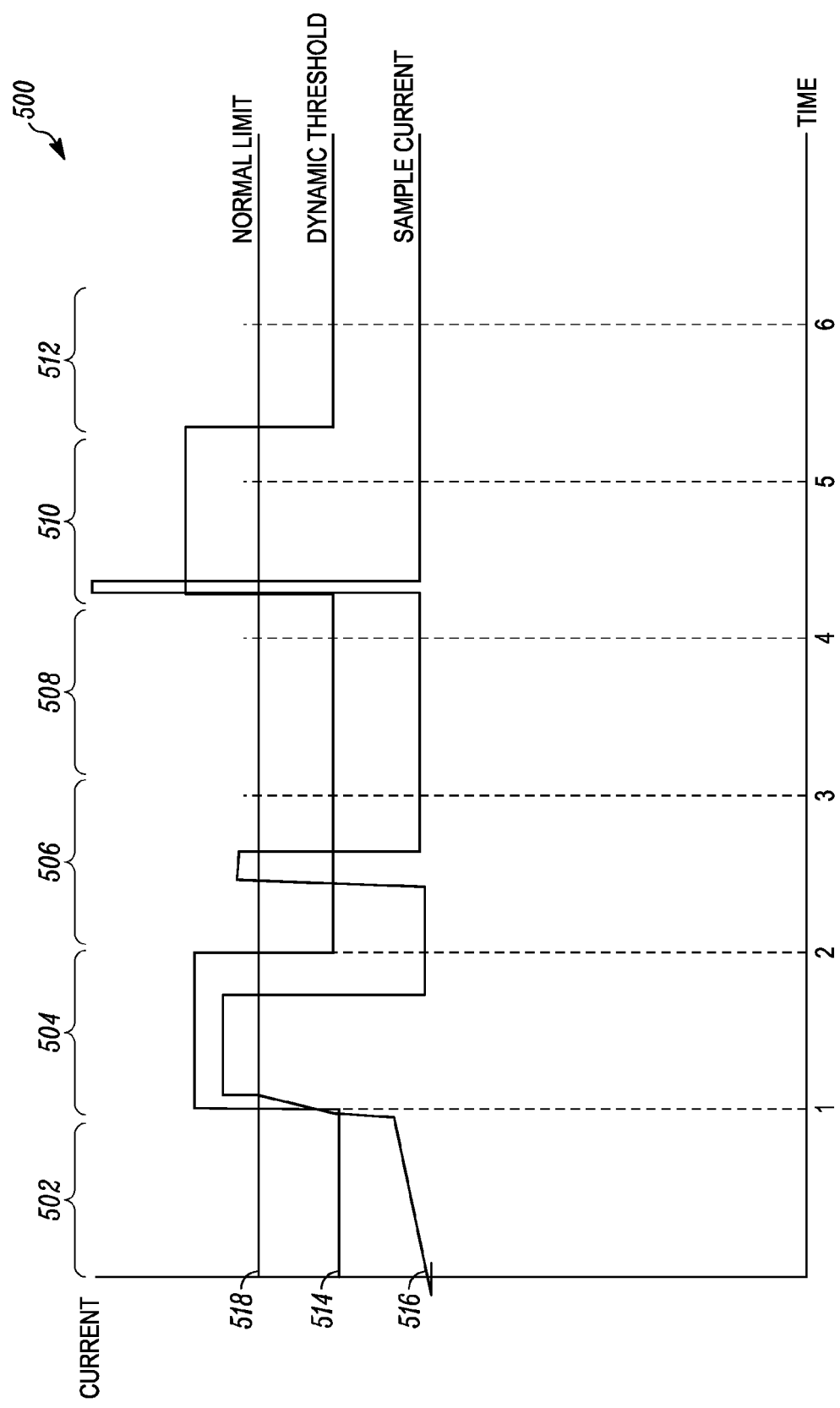
FIG. 5 is an example timing diagram showing a plurality of high current events and the corresponding dynamic over-current protection circuit response.

An example timing diagram showing a plurality of high current events and the corresponding dynamic over-current protection circuit 104 response is illustrated in FIG. 5. In this example, six different time periods 502, 504, 506, 508, 510 and 512 are shown. Initially, the dynamic threshold 514 is set at a first lower level. During the first example time period 502, the sample current 516 remains below the lower dynamic threshold 514, therefore the protection circuit 104 does not generate a trip signal.

At the beginning of the second time example period 504, the sample current 516 begins to exceed the lower dynamic threshold 514. Accordingly, the dynamic over-current threshold generator 206 temporarily raises the dynamic threshold 514 to a higher limit and starts the high-current timer 210. Once the dynamic threshold is raised to the higher limit, the sample current 516 during this time period 504 remains below the higher dynamic threshold. Accordingly, the protection circuit 104 does not generate a trip signal. At the end of this time period 504, the high-current timer 210 expires, and the dynamic over-current threshold generator 206 lowers the dynamic threshold back to the lower limit.

At the beginning of the third example time period 506, the hold-off timer 212 starts to run. Accordingly, when the sample current rises above the lower dynamic threshold 514, the dynamic over-current threshold generator 206 does not raise the dynamic threshold to the higher level because the hold-off timer 212 is still running. As a result, the over-current comparator 202 generates a trip signal, which causes current to stop flowing from the power supply 102 to the protected circuitry 106.

During the fourth example time period 508, the hold-off timer 212 has expired and the dynamic over-current threshold generator 206 would be allowed to raise the dynamic threshold 514 to the higher level. However, in this example, the sample current 516 never rises above the lower dynamic threshold 514 during time period 508. As a result, the over-current comparator 202 does not generate a trip signal.

During the fifth example time period 510, the sample current 516 goes above the lower dynamic threshold 514. Accordingly, the dynamic over-current threshold generator 206 raises the dynamic threshold 514 to the higher limit and starts the high-current timer 210. However, the sample current 516 exceeds even the higher limit. Therefore, the over-current comparator 202 generates a trip signal.

During the sixth time period 512, the dynamic over-current threshold generator 206 lowers the dynamic threshold 514 to the lower limit when the high-current timer 210 expires. After the dynamic over-current threshold generator 206 lowers the dynamic threshold 514 to the lower limit, the dynamic over-current threshold generator 206 would be allowed to raise the dynamic threshold 514 to the higher limit. However, the sample current 516 does not rise above the lower dynamic threshold 514 during this time period 512, therefore the over-current comparator 202 does not generate a trip signal.

In summary, persons of ordinary skill in the art will readily appreciate that methods and apparatus for dynamically adjusting an over-current protection threshold have been provided. Among other features, electronic devices using the disclosed methods and apparatus are able to protect circuitry from over-current conditions that may damage the circuitry, while at the same time allowing certain temporary high current events (e.g., camera flash) to occur without interrupting current flow.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of dynamically adjusting an over-current protection threshold, the method comprising:
    receiving a first trigger to switch to a high discharge current mode;
    starting a high current timer in response to receiving the trigger;
    increasing the over-current protection threshold in response to receiving the trigger;
    decreasing the over-current protection threshold in response to an expiration of the high current timer;
    starting a hold-off timer in response to the expiration of the high current timer; and
    preventing a second trigger from causing a switch to the high discharge current mode until the hold-off timer expires.

2. The method of claim 1, wherein receiving the first trigger includes detecting a sample current level exceeding the over-current protection threshold.

3. The method of claim 1, wherein receiving the first trigger includes receiving a request from an electronic device to temporarily enter the high discharge current mode.

4. The method of claim 3, wherein the electronic device enables a predetermined high current event during the high discharge current mode.

5. The method of claim 4, wherein the predetermined high current event includes a camera flash.

6. The method of claim 3, wherein receiving the request includes receiving the request via a discrete input.

7. The method of claim 3, wherein receiving the request includes receiving the request via a memory location.

8. The method of claim 1, further comprising producing a trip signal in response to a sample current level exceeding the over-current protection threshold after increasing the over-current protection threshold.

9. The method of claim 1, further comprising producing a trip signal in response to a sample current level exceeding the over-current protection threshold after decreasing the over-current protection threshold.

10. An apparatus for dynamically adjusting an over-current protection threshold, the apparatus comprising:
    an over-current comparator structured to compare a sample current to the dynamic over-current protection threshold and generate a trip signal if the sample current is higher than the dynamic over-current threshold;
    an electrical current sampler operatively coupled to the over-current comparator, the electrical current sampler being structured to supply the sample current to the over-current comparator;
    a dynamic over-current threshold generator operatively coupled to the over-current comparator, the dynamic over-current threshold generator being structured to increase the dynamic over-current protection threshold supplied to the over-current comparator;
    a high-current timer operatively coupled to the dynamic over-current threshold generator, the high-current timer being structured to cause the dynamic over-current threshold generator to decrease the dynamic over-current protection threshold; and
    a hold-off timer operatively coupled to the dynamic over-current threshold generator, the hold-off timer being structured to temporarily prevent the dynamic over-current threshold generator from raising the dynamic over-current protection threshold.

11. The apparatus of claim 10, further comprising a trigger generator operatively coupled to the dynamic over-current threshold generator, the trigger generator being structured to cause the dynamic over-current threshold generator to increase the dynamic over-current protection threshold supplied to the over-current comparator.

12. The apparatus of claim 11, wherein the trigger generator is structured to detect a sample current level exceeding the over-current protection threshold.

13. The apparatus of claim 11, wherein the trigger generator is structured to receive a request from an electronic device to temporarily enter a high discharge current mode.

14. The apparatus of claim 13, wherein the electronic device is structured to enable a predetermined high current event during the high discharge current mode.

15. The apparatus of claim 14, wherein the predetermined high current event includes a camera flash.

16. The apparatus of claim 13, wherein the trigger generator is structured to receive the request via a discrete input.

17. The apparatus of claim 13, wherein the trigger generator is structured to receive the request via a memory location.

18. The apparatus of claim 10, wherein the over-current comparator is structured to produce the trip signal in response to the sample current level exceeding the over-current protection threshold after increasing the over-current protection threshold.

19. The apparatus of claim 10, wherein the over-current comparator is structured to produce the trip signal in response to the sample current level exceeding the over-current protection threshold after decreasing the over-current protection threshold.

20. A method of dynamically adjusting an over-current protection threshold, the method comprising:
   detecting a sample current level exceeding the over-current protection threshold;
   temporarily switching to a high discharge current mode in response to detecting the sample current level exceeding the over-current protection threshold;
   waiting a hold-off period;
   receiving a request to temporarily enter the high discharge current mode; and
   temporarily switching to the high discharge current mode again in response to receiving the request.

21. The method of claim 20, wherein the electronic device enables a predetermined high current event during the high discharge current mode.

22. The method of claim 21, wherein the predetermined high current event includes a camera flash.

23. The method of claim 20, further comprising producing a trip signal in response to a sample current level exceeding the over-current protection threshold during the high discharge current mode.

24. The method of claim 20, further comprising producing a trip signal in response to a sample current level exceeding the over-current protection threshold during the hold-off period.

\* \* \* \* \*